United States Patent [19]

Graham

[11] Patent Number: 5,110,892

[45] Date of Patent: May 5, 1992

[54] SINGLE PACK POLYURETHANE ADHESIVE

[75] Inventor: Malcolm Graham, Herts, United Kingdom

[73] Assignee: National Starch and Chemical Investment Holding Corporation, Wilmington, Del.

[21] Appl. No.: 629,761

[22] Filed: Dec. 18, 1990

[51] Int. Cl.⁵ .............................................. C08G 18/10
[52] U.S. Cl. ........................................ 528/48; 528/55; 528/57; 528/59; 528/60; 528/61; 528/65; 528/66; 528/76; 528/83; 524/270; 524/275; 524/279; 524/292; 524/301; 524/705; 524/763; 524/764; 525/130; 428/484
[58] Field of Search ............... 528/48, 55, 57, 59, 528/60, 61, 65, 66, 76, 83; 524/270, 275, 279, 292, 301, 705, 763, 764, 773, 777; 525/130; 428/484

[56] References Cited

U.S. PATENT DOCUMENTS

| | | | |
|---|---|---|---|
| 2,862,616 | 12/1958 | Capozzi et al. | 206/147 |
| 2,932,385 | 4/1960 | Bollmeier et al. | 206/47 |
| 2,982,396 | 5/1961 | Shihadeh | 206/47 |
| 3,655,037 | 4/1972 | Lussier | 206/47 A |
| 3,708,379 | 1/1973 | Flint | 161/36 |
| 3,783,177 | 1/1974 | Kelso | 174/87 |
| 3,837,981 | 9/1974 | Flint | 161/36 |
| 4,116,742 | 9/1978 | Firth | 156/289 |
| 4,273,827 | 6/1981 | Sweeney et al. | 428/31 |
| 4,289,233 | 9/1981 | Firth | 206/221 |

FOREIGN PATENT DOCUMENTS 2007271A 6/1989 Spain .

Primary Examiner—Maurice J. Welsh
Attorney, Agent, or Firm—Ellen T. Dec; Edwin M. Szala

[57] ABSTRACT

Stirrable reactive polyurethane adhesive compositions are packaged in a single container by separating the reactive components with a disperable barrier layer so as to delay reaction until the entire adhesive composition is stirred together.

14 Claims, No Drawings

SINGLE PACK POLYURETHANE ADHESIVE

Multi-component polyurethane adhesives are generally packaged with the components in separate containers. In the case where quantities of adhesive are mixed by hand or with mechanical stirring, it is generally exposure to the inhalation of the vapors or by skin contact which poses the greatest health and safety hazard. Moreoever, care must be taken in the packaging to eliminate water which would cause premature crosslinking in the container. Finally, the used containers can also pose a pollution problem if they contain unreacted residue which must then be disposed of in accordance with particular hazardous waste regulations.

In accordance with the present invention stirrable reactive polyurethane adhesive compositions are packaged in a single container by separating the reactive components with a dispersible barrier layer so as to delay reaction until the entire adhesive compositon is stirred together.

Most of the problems associated with separate containers of reactive components can be overcome by packaging in one container. The more hazardous of the components can be placed at the bottom of the container with a covering cf barrier layer and the second component on the top. This will reduce any fumes from the bottom layer and also reduce the risk of pure bottom layer coming into contact with skin. The barrier layer also eliminates water ingress to the bottom layer containing the isocyanate groups. Disposal of the used container is also simplified since it will only contain crosslinked material formed from the mixing of the reactive components and can usually be classed as non-notifiable (i.e. non-hazardous) waste.

Along the suitable organic polyisocyanates (or mixtures) that may be used as one component of the reactive adhesive system disclosed herein include aliphatic and aromatic polyisocyanates and diisocyanates such as, for example, toluene diisocyanate, 1,5-naphthylene diisocyanate; 4,4-diphenylmethane diisocyanate; 4,4'-diphenyldimethane diisocyanate; di- and tetraalkyldiphenylmethane diisocyanate such as 2,2'-dimethyl-4,4'-diphenylmethane and the like; 4,4'-dibenzyldiisocyanate; 1,3-phenylene diisocyanate; 1,4-phenylene diisocyanate; 2,4-tolylene diisocyanate; 2,6-tolylene diisocyanate; mixtures of 2,4- and 2,6-tolylene diisocyanate; 2,6-dichloro-1,4-para-xylene diisocyanate; 2,2'-dichloro-4,4'-diisocyanato diphenylmethane; 2,4-dibromo-1,5-diisocyanato naphthalene; phosphorus containing isocyanates such as phenyl di-(4-isocyanato phenyl)-phosphate; butane-1,4-diisocyanate; hexane-1,6-diisocyanate; cyclohexane-1,4-diisocyanate; dicyclohexyl methane-4,4'-diisocyanate, and the like.

The present invention is also useful in packaging reactive adhesives wherein one component is any conventional isocyanate terminated polyether or polyester urethane prepolymer. The preparation of such prepolymers is well known to those skilled in the art and generally involved the reaction of a stoichmetric excess of a di- or polyisocyanate with a polyester polyol prepared by the reaction of hydroxyl terminated polyesters of aliphatic hydroxy acids and their lactones (e.g. hydroxyl polyesters of 6 to 12 carbon atoms linear aliphatic dicarboxylic acids for example adipic, azelaic, and sebacic acids) with linear aliphatic diols having from 4 to 8 carbon atoms in their molecular chains, i.e. 1,4-butane diol and 1,6-hexane diol or of a stoichmetric excess of a di- or polyisocyanate with a polyether polyol such as a polyalkylene ether or thioether.

Examples of these known polyurethane production procedures include the so-called prepolymer technique, as commonly practiced in the production of polyurethane resins, which involves mixing polyol and polyisocyanate under substantially anhydrous conditions, i.e., with usually not more than about 0.1% by weight of water, based on the total weight of the mixture, being present, and with a molar excess of the polyisocyanate over the polyol usually being employed, reacting this mixture at a temperature ranging from about room temperature to about 100° C. for about 20 minutes to about 18 hours, and then cooling the resulting prepolymer to a temperature of from about room temperature to about 60° C. This is described in more detail in U.S. Pat. Nos. 2,729,618, 3,016,364 and the like.

The second component of the adhesive system comprises any organic compound having at least two reactive hydrogen atoms (as determined by the Zerewitinoff method), said hydrogen atoms being reactive with an isocyanate group. The reactive hydrogen atoms are usually attached to oxygen, nitrogen or sulfur atoms. These compounds will have a molecular weight of from about 300 to about 20,000, preferably from about 500 to 5,000.

The organic compounds employed are preferably those having hydroxy, carboxyl, amino or mercapto groups, with the most preferred being polyhydroxyl compounds such as polyester diols, polyacetal diols, polyamide diols, polyester polyamide diols, poly(alkylene ether)diols, polythioether diols, and the like. Compounds which contain two or more different groups within these classes may also be used herein. Such compounds include, for example, amino alcohols and amino alcohols which contain two amino groups and one hydroxyl group and the like. It is preferred to use difunctional compounds although small amounts of tri-(and greater) functional compounds may be used.

Suitable polyether diols are, for example, the condensation products of ethylene oxide, propylene oxide, butylene oxide, tetrahydrofuran and the copolymerization, graft or block polymerization products thereof such, for example, as mixed ethylene oxide, propylene oxide condensates as well as products prepared by reacting olefins under high pressure with the alkylene oxide condensates to prepare graft polymerization products. Polyethers are suitable which are prepared by condensation of the aforementioned alkylene oxides with polyhydric alcohols such as ethylene glycol, 1,2-propylene glycol and 1,4-butanediol.

Suitable polyester diols which are preferably saturated include polyester amides and polyamides obtained, for example, from saturated or unsaturated polycarboxylic acids and saturated and unsaturated polyhydric alcohols, diamines, polyamines and the like. Suitable carboxylic acids for preparing these polyesters include, for example, adipic acid, succinic acid, phthalic acid, terephthalic acid, maleic acid and the like. Polyhydric alcohols useful in preparing the polyesters include, for example, ethylene glycol, 1,2-propylene glycol, 1,4-butanediol, neopentyl glycol, hexanediol, trimethylolpropane and the like. Aminoalcohols, for example, ethanol amine are also useful. Suitable diamines include diamines such as ethylene diamine, hexamethylene diamine and the like.

Suitable polyacetals, for example, can be prepared from 1,4-butanediol or hexanediol and formaldehyde.

The polythioethers are, for example, condensation products of thiodiqlycol either alone or in combination with other glycols such as ethylene glycol, 1,2-propylene glycol or with other polyhydroxy compounds disclosed above.

Polyhydroxyl compounds which already contain urea or urethane groups as well as natural polyols which may be further modified if desired, for example, castor oil, carbohydrates and the like may also be used.

The isocyanate terminated component and the hydrogen containing curing agent are used in conventional stoichiometric amounts as will be recognized by those skilled in the art. Either or both of the reactive components may contain accelerators or catalysts as are conventional in the art provided the addition thereto does not affect the stability of the individually packaged component. Thus various catalysts such as triethylene diamine, metal salts, e.g., Ti, Pb, Bi and Sn compounds, tertiary amines, acids and the like may be included as may conventional peroxide promoters such as the tertiary aromatic amines, e.g., dimethyltoluidine, dimethylaniline, diethylaniline, etc. Any of the latter components would be used in amounts conventionally employed in the art.

The barrier layer must be substantially impervious to migration of reaction chemicals from the separated components for a time which gives a useful shelf life. It must form a continuous seal across the container, protects against exposure to moisture, resist vibration and minor impact damage. At the same time, it must disperse easily in the components on mixing.

The chemicals in the barrier layer should preferably not react with either component, but if they do, they should form a reaction product which can be mixed easily into the reactive components and not form discrete lumps of non-mixed material.

The best type of barrier layer is a combination wax gel formed by mixing a wax into a liquid at a temperature above the melting point of the wax. The hot liquid mixture can be poured onto the surface of the base component to form a liquid layer which on cooling forms a grease-like gel. The consistency of the gel depends on the type and quantity of wax. High wax content gives a hard barrier layer which is difficult to disperse in the components or the adhesive and can give lower adhesion. A low wax content gives a barrier which is too soft and weak to perform satisfactorily. The useful ratio of wax to liquid is thus within the range of 2 to 98 to 20 to 80 with the preferred range of wax to liquid in the barrier layer being 4 to 96 to 10 to 90. The hot liquid barrier material should set at a speed sufficient to allow even flow over the base component and to allow wetting of the container walls. By the correct choice of ingredients a gel can be formed which is easily dispersed by shear forces induced when stirring but has sufficient strength when sandwiched between reactive components to resist vibration and minor impact. The resistance to migration of reactive chemicals is mainly determined by the liquid component of the gel.

Useful waxes for forming a gel when dissolved in the hot liquid are paraffin wax, microcrystalline wax, polyethylene wax, metal soaps, sasol wax, coal based waxes, solid polyphenyl derivatives and the like. Useful liquids for forming a gel with the wax are liquid hydrocarbon resins e.g. rosin esters, polyterpenes, polystyrene, coumarone indenes, phthalates, ester plasticizers, epoxidized natural oils, chlorinated paraffins and the like.

The preferred barrier layer is a mixture of paraffin wax in liquid polyterpene resin.

In packaging the reactive polyurethane adhesives according to the present invention, it is preferred that the lower layer be more dense than the upper layer and be sufficiently resistant to flow to allow pouring of the molten barrier layer on top without disturbing the surface. This may most easily be effected by utilizing the isocyanate containing component as the lower layer and by adding sufficent filler such as silica flour, barytes, ceramic microspheres, silica and the like together with flow control additives so as to increase the thixotropy. The fillers in this case must be dry. It is entirely possible, however, to package the curing agent as the lower layer and the isocyanate component as the upper layer, however in such packaging the barrier layer will not provide a satisfactory water ingress barrier. Moreover, in some applications it may be desirable to add filler to the upper layer.

It is important that the lower layer forms a level surface for the barrier layer to rest on. This means that it should be self-levelling when filled or subjected to vibration. However, it is also desirable that the lower layer not flow when the container is tilted from the horizontal, yet that it be easily stirrable by mixing. In order to meet these opposing requirements, it is preferred that a small amount (i.e 0.1 to 5%) of wax (particularly parraffin or sasol wax) be dispersed into the lower layer at a temperature above the melting point of the wax and then filled at this temperature so that the hot liquid will self level. If desired, the wax can be stirred in as a powder. Subsequent filling through, for instance, a heated drum unloader, melts and disperses the wax in the lower layer. On cooling a gel is thus formed which will not flow. On stirring, the gel is irreversibly broken to give an easily mixable liquid. Since vibration can also break the gel, it is also preferred that a secondary conventional thixotrope such as treated bentonite clay or precipitated calcium carbonate be used to prevent this gel breaking movement within the liquid and provide a stable lower layer with stirrable contents. The amount of the thixotrope used depends on the viscosity of the liquid components and the particular thickener employed, as well as the size of the container and the rheological properties required in the final adhesive. In general, the amount of the filler and secondary thixotrope will vary between about 20 and 80% by weight of the solids in the particular layer.

The barrier layer is then applied hot (approximately 90° C., depending on the formula) as a low viscosity liquid onto the first layer of adhesive component and normally in an amount sufficient so that it maintains a stable system. The precise thickness of the barrier layer will depend on the container size and shape and the barrier material which is chosen as well as on the surface topography of the base layer. Thus, for a one liter pack 3 mm would be practical in certain systems, while for a four liter pack it would be better to use 6 mm. On cooling, the barrier layer should form a sufficiently firm gel so that the second reactive adhesive component can be carefully poured onto the barrier layer without penetrating into the lower layer containing the curing component.

The resultant one pack reactive polyurethane adhesive system is sufficiently stable so as to be stored and transported under conventional commercially encountered conditions. When it is desired to use the adhesive, the package is subjected to sufficient shearing, as by stirring, so as to mix the barrier with both reactive components. The wax component is present at such a low concentration that it has little, if any, effect on the final adhesive properties.

In the following example, all parts are by weight and all temperatures in degrees Celcius unless otherwise noted. It should be noted that in the example, the weights stated are for the compositions of the component parts and do not relate to the mixing ratios. The ratio of prepolymer to polyol is within the normal stoichiometric limits for such polyurethane adhesives. The quantity of barrier layer will vary depending on the pack sizes and shape.

EXAMPLE I

A two component polyurethane adhesive was prepared as follows:

| Base | |
|---|---|
| Isocyanate terminated prepolymer (100% liquid) (Bayer KA 8358) | |
| Barrier | Parts |
| Liquid polyterpene | 2.66 |
| Liquid rosin ester | 3.99 |
| Paraffin wax 150/155 | 0.35 |
| Top | |
| Liquid polyol (mixture of approximately 50% Voranol P2000 and 50% Voranol P400 from Dow Chemical) | |

The barrier layer constituted 7% of the total weight and formed a layer 6 mm thick. The pack was stable for at least 3 weeks at 38° C. and the contents mixed to a uniform consistency. Only a small decrease in hardness resulted by incorporation of the barrier layer.

Additionally, the base layer may be modified as follows to produce a level surface for subsequent filling:

| Base Layer | Parts by Weight |
|---|---|
| Isocyanate terminated polymer | 95.2% |
| Cabosil TS 720, a pyrogenic silica from Union Carbide | 4% |
| Sasol Wax | 0.8% |

Similar results would be achieved using other isocyanate/polyol reactive adhesive systems as described hereinabove.

I claim:

1. In a single pack stirrable reactive polyurethane adhesive composition comprising an isocyanate terminated prepolymer lower layer and an upper layer comprising a curing agent therefor, the upper layer and the base layer are separated by a disposable barrier layer, the improvement which comprises dispersing 0.1 to 5% by weight of a wax into the base layer at a temperature above the melting point of wax.

2. The single pack polyurethane adhesive of claim 1 wherein in the barrier layer is a combination wax gel formed by mixing a wax into a liquid at a temperature above the melting point of the wax.

3. The single pack polyurethane adhesive of claim 2 wherein the barrier layer is a mixture of a wax selected from the group consisting of paraffin wax, microcrystalline wax, polyethylene wax, metal soaps, sasol wax, coal bases waxes, and solid polyphenyl in a liquid selected from the group consisting of polyterpenes, polystyrene, coumarone indenes, rosin esters, phthalates, liquid ester plasticizers, epoxidized natural oils and chlorinated paraffins.

4. The single pack polyurethane adhesive of claim 3 wherein the barrier layer is a mixture of paraffin wax in a liquid polyterpene resin.

5. The single pack polyurethane adhesive of claim 2 wherein the weight ratio of the wax to the liquid in the barrier layer is within the range of 2 to 98 to 20 to 80.

6. The single pack polyurethane adhesive of claim 5 wherein the weight ratio of the wax to the liquid in the tarrier layer is within the range of 4 to 96 to 10 to 90.

7. The single pack polyurethane adhesive of claim 1 wherein a secondary thixotrope is additionally present in the lower layer.

8. The single pack polyurethane adhesive of claim 7 wherein the secondary thixotrope is clay or precipitated calcium carbonate.

9. A process for packaging a two part stirrable reactive polyurethane adhesive composition comprising the steps of:
  1) pouring into an appropriate container a base layer comprising an isocyanate terminated prepolymer, said layer containing dispersed therein 0.1 to 5% by weight of a wax, the wax being added at a temperature above its melting point;
  2) applying, at a temperature above the melting point of the wax, a mixture of a wax selected from the group consisting of paraffin wax, microcrystalline wax, polyethylene wax, metal soaps, hydrogenated castor oil, salol wax, carnauba wax, coal bases waxes, high molecular weight polyethyleneglycol and solid polyphenyl in a liquid selected from the group consisting of liquid polyterpenes, polystyrene, liquid coumarone indenes, rosin esters, phthalates, liquid ester plasticizers, epoxidized natural oils and nonyl phenyl to form a barrier layer;
  3) allowing the barrier layer to cool; and
  4) pouring a curing agent for the prepolymer onto the barrier layer without penetrating into the lower layer.

10. The process of claim 9 wherein the barrier layer is a mixture of paraffin wax in liquid polyterpene resin.

11. The process of claim 9 wherein the weight ratio of the wax to the liquid in the barrier layer is within the range of 2 to 98 to 20 to 80.

12. The process of claim 9 wherein the weight of the wax to the liquid in the barrier layer is within the range of 4 to 96 to 10 to 90.

13. The process of claim 9 wherein a secondary thixotrope is additionally present in the lower layer.

14. The process of claim 13 wherein the secondary thixotrop is clay or precipitated calcium carbonate.

* * * * *